US012682598B2

(12) United States Patent
Matsuno

(10) Patent No.: US 12,682,598 B2
(45) Date of Patent: Jul. 14, 2026

(54) CONTROL APPARATUS AND CONTROL METHOD EXECUTED BY IMAGE CAPTURE SYSTEM

(71) Applicant: CANON KABUSHIKI KAISHA, Tokyo (JP)

(72) Inventor: Keisuke Matsuno, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 441 days.

(21) Appl. No.: 18/191,004

(22) Filed: Mar. 28, 2023

(65) Prior Publication Data

US 2023/0343064 A1 Oct. 26, 2023

(30) Foreign Application Priority Data

Apr. 20, 2022 (JP) ................................ 2022-069593

(51) Int. Cl.
*G06V 10/60* (2022.01)
*G06F 3/14* (2006.01)
(Continued)

(52) U.S. Cl.
CPC ................ *G06V 10/60* (2022.01); *G06F 3/14* (2013.01); *G06V 10/761* (2022.01); *G09G 3/22* (2013.01); *G09G 2320/0626* (2013.01)

(58) Field of Classification Search
CPC ........ G06V 10/60; G06V 10/761; G06F 3/14; G09G 3/22; G09G 2320/0626;
(Continued)

(56) References Cited

U.S. PATENT DOCUMENTS 11,238,281 B1 * 2/2022 Cui ........................ B64U 30/20
2011/0075894 A1 * 3/2011 Steinberg ............ G06V 40/162 382/118
(Continued)

FOREIGN PATENT DOCUMENTS

JP H05-344512 A 12/1993
JP 2014-525049 A 9/2014
(Continued)

OTHER PUBLICATIONS

User Manual Tessera Processing Tessera Version 3.1 (Year: 2021).*
(Continued)

*Primary Examiner* — Wassim Mahrouka
(74) *Attorney, Agent, or Firm* — Carter, DeLuca & Farrell LLP

(57) ABSTRACT

A control apparatus of an image capture system that performs image capture using an image displayed by a display apparatus as a background is provided. The control apparatus assigns capturing periods of different timings to respective image capture apparatuses of the image capture system and controls the image capture apparatuses so that each of the image capture apparatuses performs image capture during the capturing period assigned thereto. The control apparatus further causes the display apparatus to, during each of the capturing periods, display an image corresponding to a position and an orientation of the image capture apparatus to which the capturing period has been assigned.

15 Claims, 8 Drawing Sheets

(51) Int. Cl.
*G06V 10/74* (2022.01)
*G09G 3/22* (2006.01)

(58) Field of Classification Search
CPC ............. G09G 2340/0492; G09G 5/10; G09G 2340/0435; G09G 5/38; G09G 5/12; H04N 19/31; H04N 9/76; H04N 19/33; H04N 23/73; H04N 23/633; H04N 5/275; H04N 5/262; H04N 23/90; H04N 23/661; H04N 23/84; G06T 15/20
See application file for complete search history.

(56) References Cited

U.S. PATENT DOCUMENTS

| | | | | |
|---|---|---|---|---|
| 2014/0253792 A1* | 9/2014 | Watanabe | H04N 23/611 348/362 |
| 2016/0088209 A1* | 3/2016 | Tanaka | H04N 23/632 348/211.8 |
| 2018/0069990 A1 | 3/2018 | Murakami et al. | |
| 2020/0145644 A1* | 5/2020 | Cordes | G06T 15/50 |

FOREIGN PATENT DOCUMENTS

| | | | |
|---|---|---|---|
| JP | 2014179874 | A | 9/2014 |
| JP | 2016-066898 | A | 4/2016 |
| WO | 2012/173998 | A2 | 12/2012 |
| WO | 2016/061565 | A1 | 4/2016 |
| WO | 2019/015120 | A1 | 1/2019 |
| WO | 2022040300 | A1 | 2/2022 |

OTHER PUBLICATIONS

Korean Office Action issued in corresponding KR Patent Application No. 10-2023-0043287, dated May 22, 2025.
Notice of Reasons for Refusal issued by the Japanese Patent Office on Sep. 2, 2024 in corresponding JP Patent Application No. 2022-069593, with English translation.
Office Action issued by the Intellectual Property of India on Jul. 2, 2024 in corresponding IN Patent Application No. 202344025689, pp. 1-6.
Combined Search and Examination Report issued by the UK Intellectual Property Office on Nov. 7, 2023, in corresponding GB Patent Application No. GB2305742.5.
Notice of Reasons for Refusal issued by the Japanese Patent Office on Apr. 24, 2026 in corresponding JP Patent Application No. 2025-027347, with English translation.

* cited by examiner

CONTROL APPARATUS AND CONTROL METHOD EXECUTED BY IMAGE CAPTURE SYSTEM

BACKGROUND OF THE INVENTION

Field of the Invention

The present invention relates to a control apparatus and a control method executed by an image capture system.

Description of the Related Art

Visual Effects (VFX) techniques to generate a video of with unrealistic scenes by compositing computer graphics (CG) with a live-action video are known. Furthermore, in-camera VFX, a method of obtaining a VFX video without CG composition processing by capturing a subject using a display apparatus or a screen that displays CG in the background is known.

In order to realize a natural VFX video using in-camera VFX, it is necessary to align the position and orientation of a virtual camera at the time of rendering of CG with the position and orientation of a camera that captures a live-action video. Therefore, it is necessary to detect the position and orientation of the camera, and also change CG in accordance with the detected position and orientation. Japanese Patent Laid-Open No. 2014-525049 discloses a technique to change an image displayed on a head-mounted display worn by a user in accordance with the position and orientation of the user.

SUMMARY OF THE INVENTION

The present invention, in one aspect thereof, provides a control apparatus and a control method of an image capture system that can make it easier to capture an in-camera VFX video using a plurality of image capture apparatuses.

According to an aspect of the present invention, there is provided a control apparatus of an image capture system that performs image capture using an image displayed by a display apparatus as a background, the control apparatus comprising: one or more processors that execute a program stored in a memory and thereby function as: an assigning unit configured to assign capturing periods of different timings to respective image capture apparatuses of the image capture system; an image capture control unit configured to control the image capture apparatuses so that each of the image capture apparatuses performs image capture during the capturing period assigned thereto; and a display control unit configured to cause the display apparatus to, during each of the capturing periods, display an image corresponding to a position and an orientation of the image capture apparatus to which the capturing period has been assigned.

According to another aspect of the present invention, there is provided a control method executed by an image capture system that performs image capture using an image displayed by a display apparatus as a background, the control method comprising: assigning capturing periods of different timings to respective image capture apparatuses of the image capture system; controlling the image capture apparatuses so that each of the image capture apparatuses performs image capture during the capturing period assigned thereto; and causing the display apparatus to, during each of the capturing periods, display an image corresponding to a position and an orientation of the image capture apparatus to which the capturing period has been assigned.

According to a further aspect of the present invention, there is provided an image capture apparatus, comprising: one or more processors that execute a program stored in a memory and thereby function as: an obtainment unit configured to obtain information related to image capture timings thereof and of another image capture apparatus from an external apparatus; and a control unit configured to control the image capture timings of the other image capture apparatus based on the information.

According to another aspect of the present invention, there is provided a computer-readable storage medium storing a program causing, when the program is executed by a computer, to function as a control apparatus of an image capture system that performs image capture using an image displayed by a display apparatus as a background, the control apparatus comprising: an assigning unit configured to assign capturing periods of different timings to respective image capture apparatuses of the image capture system; an image capture control unit configured to control the image capture apparatuses so that each of the image capture apparatuses performs image capture during the capturing period assigned thereto; and a display control unit configured to cause the display apparatus to, during each of the capturing periods, display an image corresponding to a position and an orientation of the image capture apparatus to which the capturing period has been assigned.

Further features of the present invention will become apparent from the following description of example embodiments (with reference to the attached drawings).

DESCRIPTION OF THE EMBODIMENTS

Figure 1:
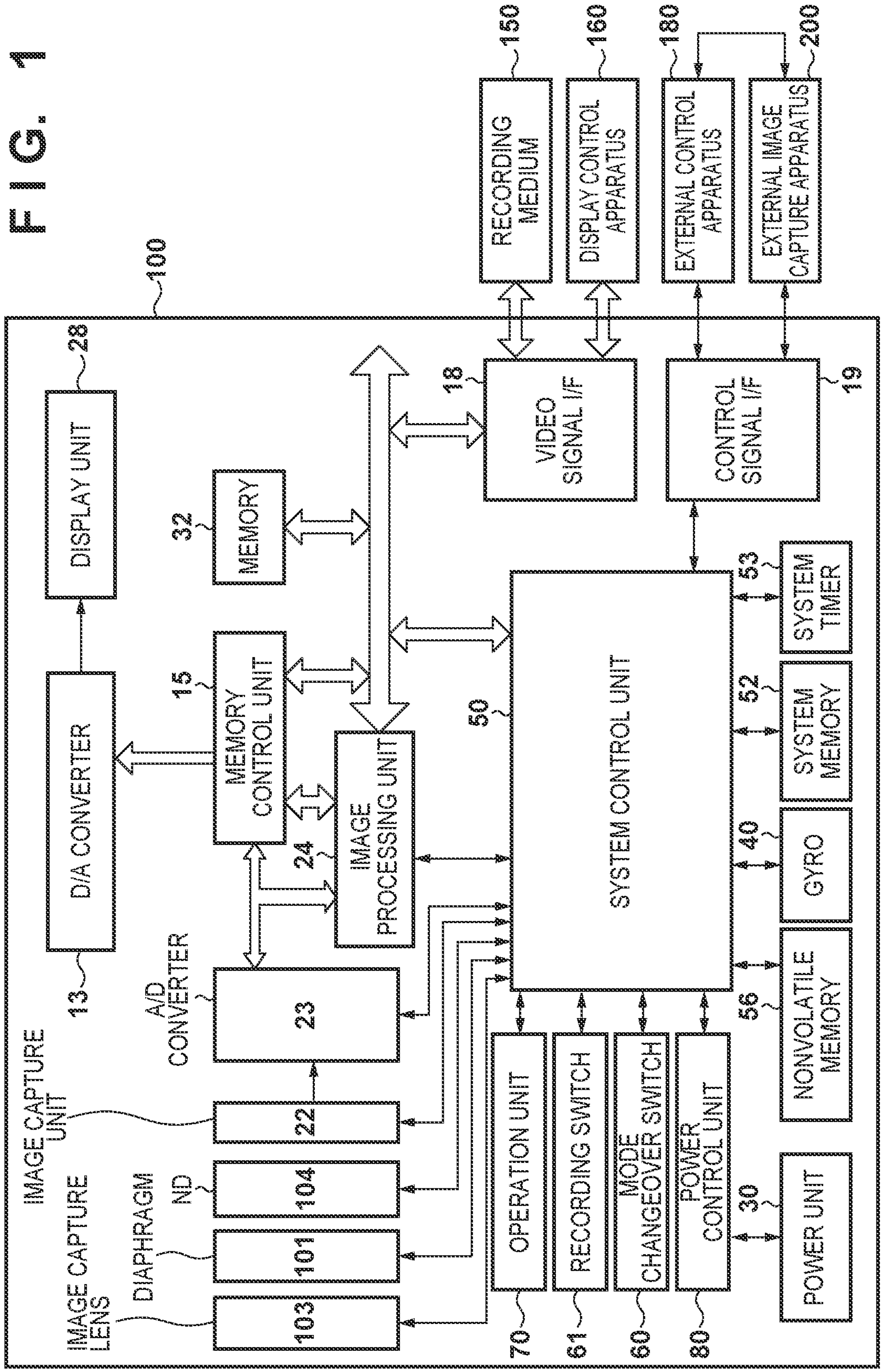
FIG. 1 is a block diagram showing an example functional configuration of an image capture apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In a case where in-camera VFX videos of the same scene are captured using a plurality of cameras, there is a problem that changing an image of a background in accordance with the position and orientation of one camera causes a mismatch between the positions and orientations of other cameras and the background. Therefore, conventionally, other cameras cannot perform image capture until the completion of image capture by one camera, or the background needs to be re-composited in a post-production process with respect to the videos of cameras whose positions and orientations do not match the background.

In view of this, in the present embodiments, a background image is displayed in a period in which image capture sessions of respective image capture apparatuses do not overlap; this enables each individual image capture apparatus to perform image capture using an appropriate background image that suits the position and orientation thereof, while preventing the plurality of image capture apparatuses from capturing the same background image.

First Embodiment (Example Configuration of Image Capture Apparatus 100)

FIG. 1 is a block diagram showing an example functional configuration of an image capture apparatus 100 according to a first embodiment. An image capture lens 103 (an image-forming optical system) includes a plurality of lenses, including movable lenses. The movable lenses include at least a focusing lens, and may further include a zoom lens(es) and/or a shift lens(es). The image capture lens 103 forms an optical image of a subject on an image capture plane.

A diaphragm 101 has a variable-size aperture, and adjusts the amount of incident light. The aperture size of the diaphragm 101 is controlled by a system control unit 50, which will be described later. A Neutral Density (ND) 104 is a light-reducing filter that is inserted on an optical path as necessary.

An image capture unit 22 includes an image sensor. The image sensor may be, for example, a known CCD or CMOS color image sensor that includes color filters based on the primary-color Bayer array. The image sensor includes a pixel array in which a plurality of pixels are two-dimensionally arrayed, and a peripheral circuit for reading out signals from the respective pixels. In each pixel, charges corresponding to the amount of incident light are accumulated by way of photoelectric conversion. A signal having a voltage corresponding to the amount of charges accumulated during an exposure period is read out from each pixel; as a result, a pixel signal group (analog image signals) indicating the optical image of the subject formed on the image capture plane is obtained.

An A/D converter 23 outputs digital image signals (image data) by applying A/D conversion to the analog image signals that have been read out from the image capture unit 22. Note that in a case where the image capture unit 22 has an A/D conversion function, the A/D converter 23 is unnecessary.

An image processing unit 24 generates signals and image data that suit the intended use, and obtains and/or generates various types of information, by applying preset image processing to image data output from the A/D converter 23 and a memory control unit 15. The image processing unit 24 may be, for example, a dedicated hardware circuit, such as an Application Specific Integrated Circuit (ASIC), that has been designed to realize specific functions. Alternatively, the image processing unit 24 may be configured to realize specific functions as a result of a processor, such as a Digital Signal Processor (DSP) and a Graphics Processing Unit (GPU), executing software. The image processing unit 24 outputs information and data that have been obtained or generated to the system control unit 50, the memory control unit 15, and the like in accordance with the intended use.

The image processing applied by the image processing unit 24 can include, for example, preprocessing, color interpolation processing, correction processing, detection processing, data editing processing, evaluation value calculation processing, special effects processing, and so forth.

The preprocessing can include signal amplification, reference level adjustment, defective pixel correction, and so forth.

The color interpolation processing is processing which is performed in a case where the image sensor is provided with color filters, and which interpolates values of color components that are not included in discrete pieces of pixel data that compose image data. The color interpolation processing is also called demosaicing processing.

The correction processing can include processing for white balance adjustment, tone correction, correction of image deterioration caused by optical aberration of the image capture lens 103 (image recovery), correction of the influence of vignetting of the image capture lens 103, color correction, and so forth.

The detection processing can include detection of a feature region (a face region, a human body region, etc.) and a motion therein, processing for recognizing a person, and so forth.

The data editing processing can include processing for cutout of a region (cropping), composition, scaling, encoding and decoding, generation of header information (generation of a data file), and so forth. The data editing processing also includes generation of image data for display and image data for recording.

The evaluation value calculation processing can include processing for generation of signals and evaluation values used in automatic focus detection (AF), generation of evaluation values used in automatic exposure control (AE), and so forth.

The special effects processing can include, for example, processing for addition of blur effects, alteration of shades of colors, relighting, and so forth.

Note that these are examples of processing that can be applied by the image processing unit 24, and do not limit processing applied by the image processing unit 24.

A gyroscope 40 is a motion sensor that outputs a signal indicating a motion of the image capture apparatus 100. The gyroscope 40 is, for example, a triaxial angular velocity sensor that detects angular velocities around three axes: an axis parallel to the optical axis of the image capture lens 103, an axis parallel to the gravitational direction, and an axis perpendicular to these two axes. Note that a sensor that detects accelerations in the respective axis directions may be used in combination.

The system control unit 50, which will be described later, detects a motion of the image capture apparatus 100 based on an output from the gyroscope 40. The system control unit 50 realizes an image blur correction function by controlling the position of the shift lens included in the image capture lens 103 and the position at which the image processing unit 24 crops a captured image in accordance with the detected motion.

The system control unit 50 is, for example, a processor (a CPU, an MPU, a microprocessor, or the like) that can execute programs. The system control unit 50 controls the operations of each component of the image capture apparatus 100 and realizes the functions of the image capture apparatus 100 by reading programs stored in a nonvolatile memory 56 into a system memory 52 and executing the programs. Note that in a case where the image capture lens 103 is interchangeable, the system control unit 50 controls the operations of the image capture lens 103 by communicating with a controller included in the image capture lens 103.

The system control unit 50 also controls the operations related to image capture and recording. Specifically, the system control unit 50 controls automatic exposure control (AE) and the operations of automatic focus detection (AF) based on evaluation values generated by the image processing unit 24, the image capture operations of the image capture unit 22, the operations of the image processing unit 24, the operations to record image data for recording into a recording medium 150, and so forth.

The nonvolatile memory 56 is electrically rewritable, and stores, for example, programs executed by the system control unit 50, various types of setting values of the image capture apparatus 100, GUI data, and so forth. The system memory 52 is used by the system control unit 50 to read programs to be executed, and temporarily store variables and the like during the execution of programs.

Image data output from the A/D converter 23 is supplied to the memory control unit 15 either directly or via the image processing unit 24. The memory control unit 15 manages access to a memory 32. The memory control unit 15 stores image data supplied from the A/D converter 23 or the image processing unit 24 into the memory 32. Also, the memory control unit 15 supplies image data for display stored in a video memory region of the memory 32 to a D/A converter 13. The D/A converter 13 generates analog video signals that are appropriate for a display unit 28 based on the image data for display.

The memory 32 is used as a data buffer memory, a working memory for the image processing unit 24, a video memory, and the like.

The display unit 28 is, for example, a liquid crystal display or an organic EL display. As a result of continuously executing the moving image capture by the image capture unit 22 and display of the obtained moving images on the display unit 28, the display unit 28 can function as an electronic viewfinder (EVF). Moving images that are displayed to cause the display unit 28 to function as the EVF are referred to as live-view images. Note that the display unit 28 may be a touch display.

A system timer 53 includes a clock generator that outputs a reference clock, and a built-in clock. The system timer 53 supplies clock signals that have been generated based on the reference clock to respective function blocks of the image capture apparatus 100. Furthermore, using the built-in clock, the system timer 53 supplies information of the current date and time, and measures a period of a specific length.

Note that in the present embodiment, the clock signals generated by the system timer 53 can be supplied to an external apparatus (e.g., an external control apparatus 180 and/or an external image capture apparatus 200) via a control signal I/F 19. In this case, the clock signals can be used as signals for synchronizing the operations of the external apparatus with the operations of the image capture apparatus 100 (external clocks). Thus, the system timer 53 may operate as a supplying means or unit for supplying an external clock signal to an external apparatus (e.g., an external control apparatus 180 and/or an external image capture apparatus 200) via a control signal I/F 19.

Meanwhile, it is also possible to receive clock signals (external clocks) supplied from the external apparatus (e.g., the external control apparatus 180 and/or the external image capture apparatus 200) via the control signal I/F 19. In this case, the system control unit 50 controls the system timer 53 so that the clock signals are generated based on the external clocks. As a result, the operations of the image capture apparatus 100 can be synchronized with the operations of the apparatus that supplies the external clocks (or another apparatus that receives the same external clocks that have been supplied).

The control signal I/F 19 can communicate with each of the external control apparatus 180 and the external image capture apparatus 200. Furthermore, the system control unit 50 can control the operations of the image capture apparatus 100 in accordance with a control signal that has been supplied from the external apparatus via the control signal I/F 19.

For example, the system control unit 50 can control the operations of the image capture unit 22 and the operations of the image processing unit 24 in accordance with a control signal supplied from the external apparatus. Furthermore, in response to a request via a control signal supplied from the external apparatus, the system control unit 50 can also transmit information related to the image capture apparatus 100 to the external apparatus that has issued the request. Moreover, the system control unit 50 can output information related to the timings of the operations (e.g., image capture timings) of the image capture apparatus 100 to the external control apparatus 180 and the external image capture apparatus 200 via the control signal I/F 19.

Notifying the external image capture apparatus 200 of information of an operation cycle of the image capture apparatus 100 (e.g., image capture timings) via the control signal I/F 19 enables the operation cycle of the image capture apparatus 100 to coincide with an operation cycle of the external image capture apparatus 200. Furthermore, conversely, receiving information of the operation cycle from the external image capture apparatus 200 via the control signal I/F 19 and controlling the operation timings of the image capture apparatus 100 in the system control unit 50 enable the operation cycle of the image capture apparatus 100 to coincide with the operation cycle of the image capture apparatus 200.

A mode changeover switch 60, a recording switch 61, and an operation unit 70 are examples of operation members (switches, buttons, dials, levers, a touch panel, and the like) that allow a user to input instructions to the image capture apparatus 100 (system control unit 50).

The mode changeover switch 60 is a switch for switching (making a selection) among operation modes of the image capture apparatus 100. Typical operation modes include, but are not limited to, a moving image recording mode, a still image recording mode, and a reproduction mode. Note that the operation modes may be hierarchized. For example, the moving image recording mode can include two or more of an auto image capture mode, an auto scene determination mode, a manual mode, a scene mode, a program AE mode, a custom mode, and so forth. Furthermore, the scene mode can include a plurality of modes that correspond to target scenes (a night view mode, a starry sky mode, a portrait mode, a sports mode, and so forth).

The mode changeover switch 60 may allow all of the operation modes to be selected, or may allow only operation modes in a specific hierarchy to be selected. The latter case adopts a configuration in which operation modes in other hierarchies are selected using another operation member.

Each time the recording switch 61 is operated, the image capture apparatus 100 switches between an image capture standby state and an image capture state. Note that the image capture mentioned here refers to image capture that is intended for recording. Image capture that is not intended for recording (e.g., image capture for live-view display) can be carried out in the image capture standby state as well.

The operation unit 70 is a collective term for operation members other than the mode changeover switch 60 and the recording switch 61. The operation members that compose the operation unit 70 have names corresponding to the assigned functions. Typical examples include direction keys, a menu button, a determination button, and so forth. Note that a function that is assigned to the same input member may be variable. Furthermore, input members may be software buttons or keys that utilize a touch display. Moreover, the operation unit 70 may include an input member that supports a contactless input method, such as a voice input and an eye-gazing input.

A power control unit 80 includes a battery detection circuit, a DC-DC converter, a switch circuit that changes a block to which a current is to be applied, and so forth. The power control unit 80 detects whether a battery has been loaded, the type of the battery, and the remaining battery level. Furthermore, the power control unit 80 supplies an appropriate voltage to each component of the image capture apparatus 100 by controlling the DC-DC converter based on the detection results and an instruction from the system control unit 50.

A power unit 30 may be one of, for example, a primary battery such as an alkaline battery and a lithium battery, a secondary battery such as a NiCd battery, a NiMH battery, and a Li-ion battery, and an AC adapter.

Moving image data (including sound data) and still image data for recording that have been obtained through image capture are recorded into the recording medium 150. The recording medium 150 is, for example, a semiconductor memory card, an externally-attached recording apparatus (such as an HDD and an SSD), or the like.

A video signal I/F 18 is an interface with the recording medium 150 and a display control apparatus 160. The video signal I/F 18 includes hardware appropriate for the specifications with which connected devices and the recording medium 150 comply. In the present embodiment, the image capture apparatus 100 can output items to the outside (display control apparatus 160) via the video signal I/F 18 based on image data for display.

The display control apparatus 160 applies tone characteristics (gamma curves) appropriate for a non-illustrated display apparatus to video signals that are output from the image capture apparatus 100 via the video signal I/F 18, and outputs the resultant video signals to the display apparatus.

(Image Capture System)

Figure 2:
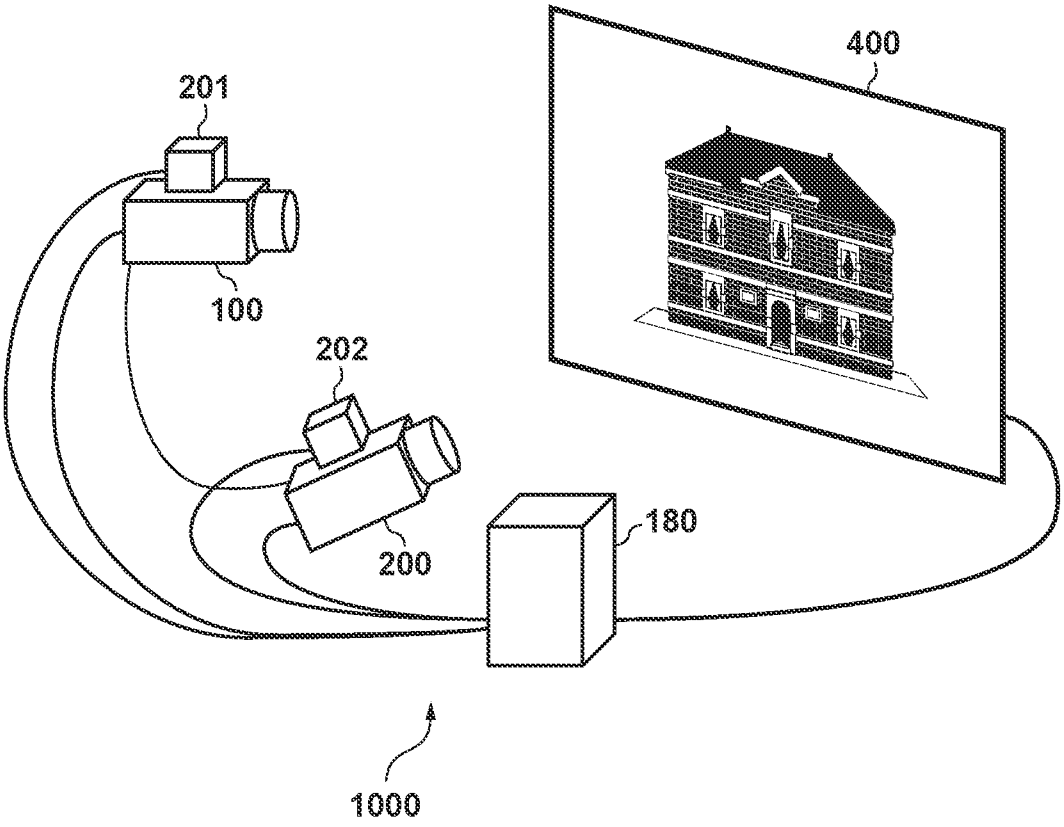
FIG. 2 is a schematic diagram showing an example configuration of an image capture system according to an embodiment.

FIG. 2 is a schematic diagram showing an example of an image capture system 1000 for in-camera VFX videos according to the present embodiment. Note that in FIG. 2, the scales of apparatuses are not uniform. Furthermore, in the following description, the external control apparatus 180 and the external image capture apparatus 200 will be referred to as the control apparatus 180 and the image capture apparatus 200, respectively.

The image capture system 1000 includes a plurality of image capture apparatuses (here, the image capture apparatuses 100 and 200), the control apparatus 180 that acts as a control apparatus of the image capture system, and a display apparatus 400. Here, in order to facilitate the description and understanding, it is assumed that the image capture apparatus 200 has the functional configuration shown in FIG. 1, similarly to the image capture apparatus 100. Note that the image capture apparatuses included in the image capture system may have different functional configurations, as long as their operations can be controlled by the control apparatus 180. Furthermore, the image capture system 1000 may include three or more image capture apparatuses.

The display apparatus 400 displays an image that serves as a background of a scene captured by the image capture apparatuses 100 and 200. The display apparatus 400 includes, for example, a large number of LED panels that are arranged in the vertical and horizontal directions, and may be called an LED wall. In the present specification, in order to facilitate the description and understanding, it is assumed that the display apparatus 400 includes one LED panel and the control apparatus 180 directly controls display on the display apparatus 400. Note that in reality, it is possible to separately use a display control apparatus for dividing a CG image rendered by the control apparatus 180 into a large number of LED panels included in the display apparatus 400 and displaying the divided CG image.

In the image capture system 1000, the control apparatus 180 causes the display apparatus 400 to display CG corresponding to the position and orientation of an image capture apparatus that performs image capture, in line with the image capture timings of the respective image capture apparatuses that have been connected. Alternatively, the control apparatus 180 controls the timings of operations the display apparatus 400 and the respective image capture apparatuses so that one of the connected image capture apparatuses performs image capture during a period in which the display apparatus 400 displays CG corresponding to the position and orientation of that one image capture apparatus.

For example, in a case where a period of one frame is divided into capturing periods of the respective image capture apparatuses, every image capture apparatus can execute image capture using CG corresponding to its own position and orientation as a background within one frame period. Each of the plurality of image capture apparatuses can obtain captured images in which CG corresponding to its own position and orientation is used as a background at a predetermined frame rate; this is substantially equal to parallel execution of capturing of in-camera VFX videos by the plurality of image capture apparatuses. In this way, the control apparatus 180 enables the plurality of image capture apparatuses to capture in-camera VFX videos in parallel.

Note that when rendering a CG image corresponding to the position and orientation of an image capture apparatus, the control apparatus 180 can specify a range to be actually captured out of the screen of the display apparatus 400 based on information of the position and orientation and on information of the angle of view (the focal length of the image capture lens) obtained from the image capture apparatus. For example, the control apparatus 180 may reduce the processing load associated with rendering by making the image quality of the outside of the image capture range (outer frustum) lower than that of the inside of the image capture range (inner frustum) in rendering CG.

In FIG. 2, position and orientation detection apparatuses 201 and 202 are respectively mounted on the image capture apparatuses 100 and 200, and respectively output pieces of position and orientation information of the image capture apparatuses 100 and 200 to the control apparatus 180. These position and orientation detection apparatuses are known as a camera tracking system; therefore, a description of details thereof is omitted. For example, the positions and orientations of the image capture apparatuses can be detected by using an image obtained by capturing a plurality of markers whose absolute positions are known, or by using signals received from a plurality of transmitters whose absolute positions are known.

Figure 3:
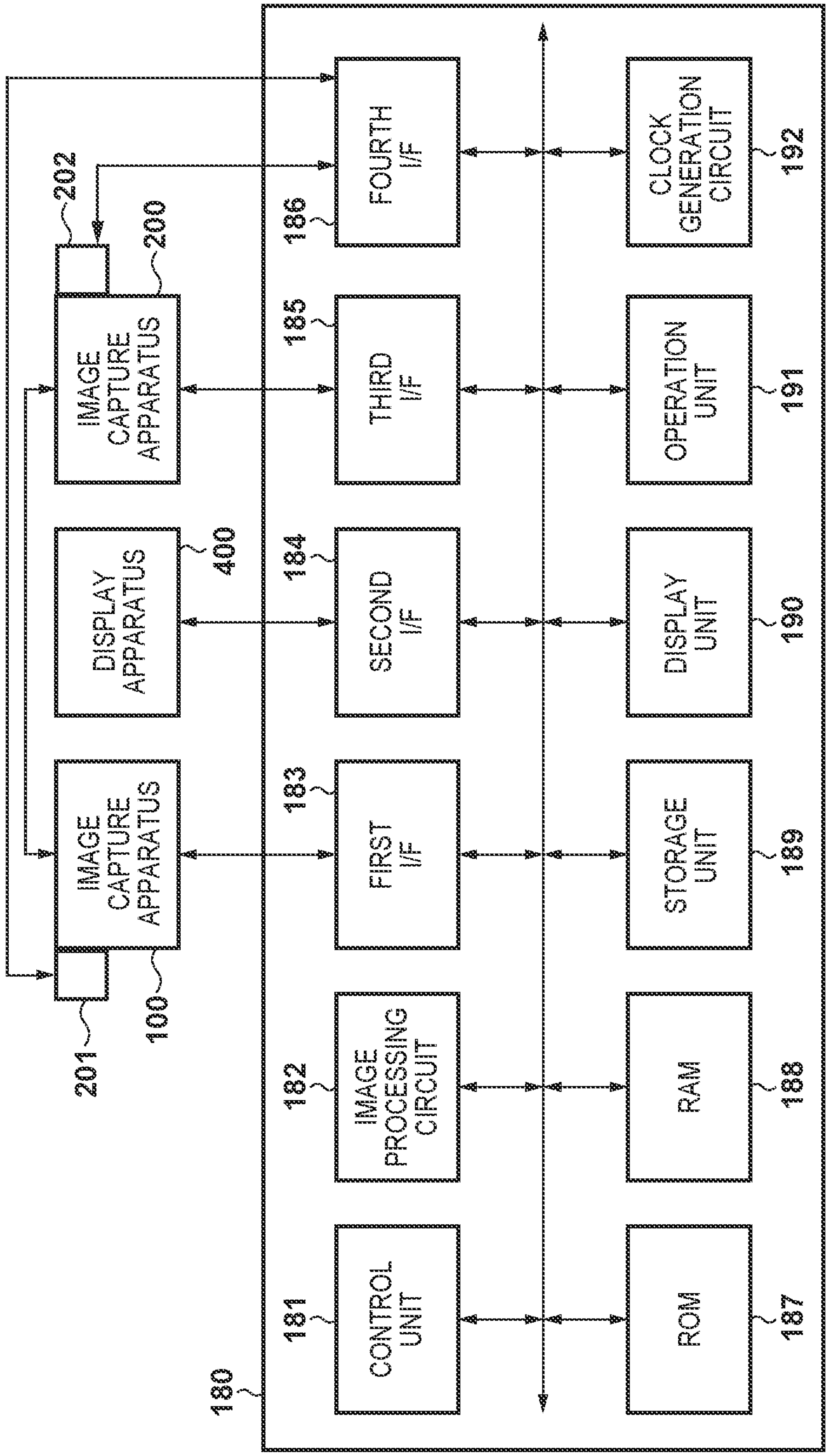
FIG. 3 is a block diagram showing an example functional configuration of a control apparatus of the image capture system according to an embodiment.

FIG. 3 is a block diagram showing an example functional configuration of the control apparatus 180. The control apparatus 180 can be realized using, for example, a computer device.

A control unit 181 is, for example, a CPU, and realizes the functions of the display control apparatus 180 by reading a program (display control application program) stored in a ROM 187 into a RAM 188 and executing the program.

An image processing circuit 182 is, for example, a graphic board equipped with a GPU. The image processing circuit 182 can execute image processing, such as rendering of CG, faster than the control unit 181.

A first I/F 183, a second I/F 184, a third I/F 185, and a fourth I/F 186 are communication interfaces for connecting external devices. In the present embodiment, it is assumed that the image capture apparatus 100 is connected to the first I/F 183, the display apparatus 400 is connected to the second I/F 184, the image capture apparatus 200 is connected to the third I/F 185, and the position and orientation detection apparatuses 201 and 202 are connected to the fourth I/F 186. In the present embodiment, the first I/F 183 to the third I/F 185 can transmit video signals, synchronization signals, and control signals. Note that a larger number of communication interfaces may be included to allow a larger number of devices to be connected.

Note that although the illustration shows that the display control apparatus 180 is connected to each of the image capture apparatuses 100 and 200 and the display apparatus 400 via one I/F for the sake of convenience, the connection may be done via a plurality of different I/Fs in accordance with signals to be communicated. The same goes for connection between the display control apparatus 180 and the display apparatus 400 and the image capture apparatus 200.

With respect to the image capture apparatus 100, the display apparatus 400, and the image capture apparatus 200, the control unit 181 obtains information and signals and controls operations by way of communication via the first I/F 183 to the third I/F 185. Note that the display control apparatus 180 may include four or more communication interfaces with external apparatuses.

Furthermore, the control unit 181 continuously obtains pieces of position and orientation information of the image capture apparatuses 100 and 200 from the position and orientation detection apparatuses 201 and 202 by way of communication via the fourth I/F 186. Note that with regard to an image capture apparatus whose position and image capture direction are fixed and known among the image capture apparatuses 100 and 200, there is no need to obtain the position and orientation information from the position and orientation detection apparatus.

The ROM 187 stores programs executed by the control unit 181 (e.g., firmware, an OS, and an application program), GUI image data of a menu screen and the like, setting values of the display control apparatus 180, and so forth.

The RAM 188 is not only used as a main memory for the control unit 181, but also used as a working memory for an image processing circuit 182 and a video memory for a display unit 190.

A storage unit 189 is a large-capacity storage apparatus, such as a hard disk and an SSD. The storage unit 189 stores data necessary for rendering CG to be displayed on the display apparatus 400 (e.g., a three-dimensional model), and an application for rendering CG. Note that the OS and applications may be stored in the storage unit 189 rather than the ROM 187.

The display unit 190 is, for example, a liquid crystal display apparatus. The display unit 190 may be a touch display. The display unit 190 displays, for example, screens of an image capture control application. Furthermore, the display unit 190 may also display video signals that are output by the image capture apparatuses 100 and 200 via the video signal I/F 18. In addition, the display unit 190 may be an external display apparatus.

An operation unit 191 includes a plurality of input devices that can be operated by a user, such as a keyboard, a mouse, and a touchpad. In a case where the display unit 190 is a touch display, a touch panel composes the operation unit 191.

A clock generation circuit 192 generates synchronization signals (clocks) for placing the operations of the image capture apparatus 100, the display apparatus 400, and the image capture apparatus 200 in synchronization. Note that the clocks may be obtained from external apparatuses (including the image capture apparatuses 100 and 200).

(Operations of Image Capture System)

Figure 4:
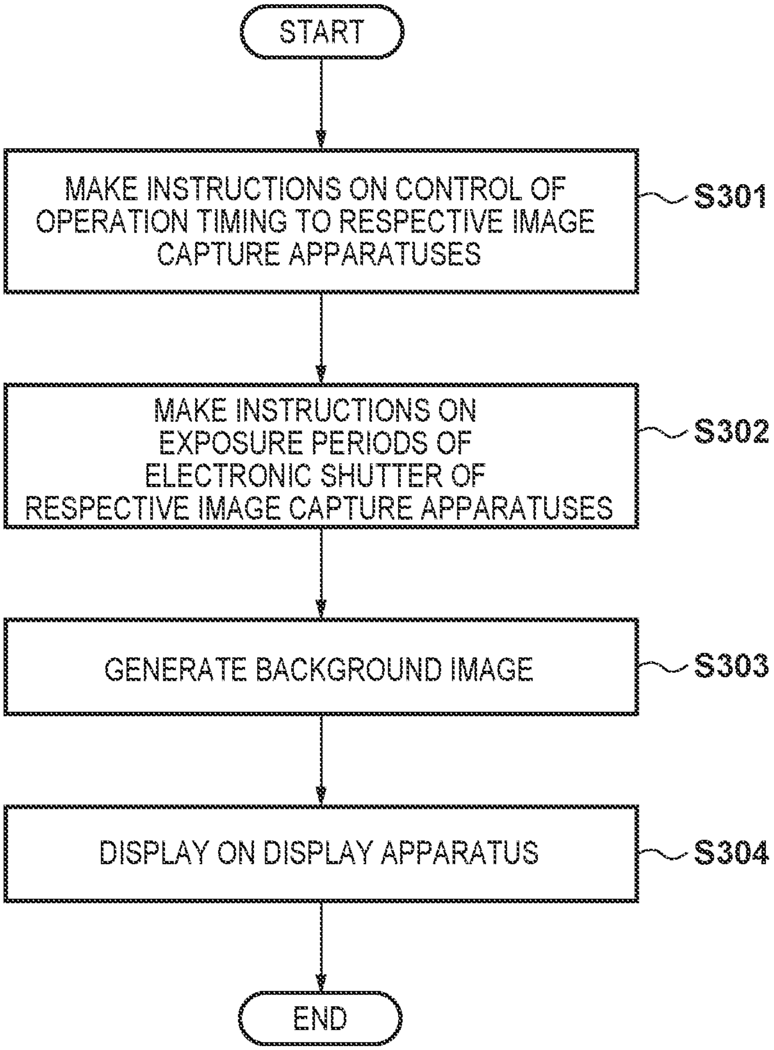
FIG. 4 is a flowchart related to the operations of the control apparatus according to an embodiment.
Figure 5:
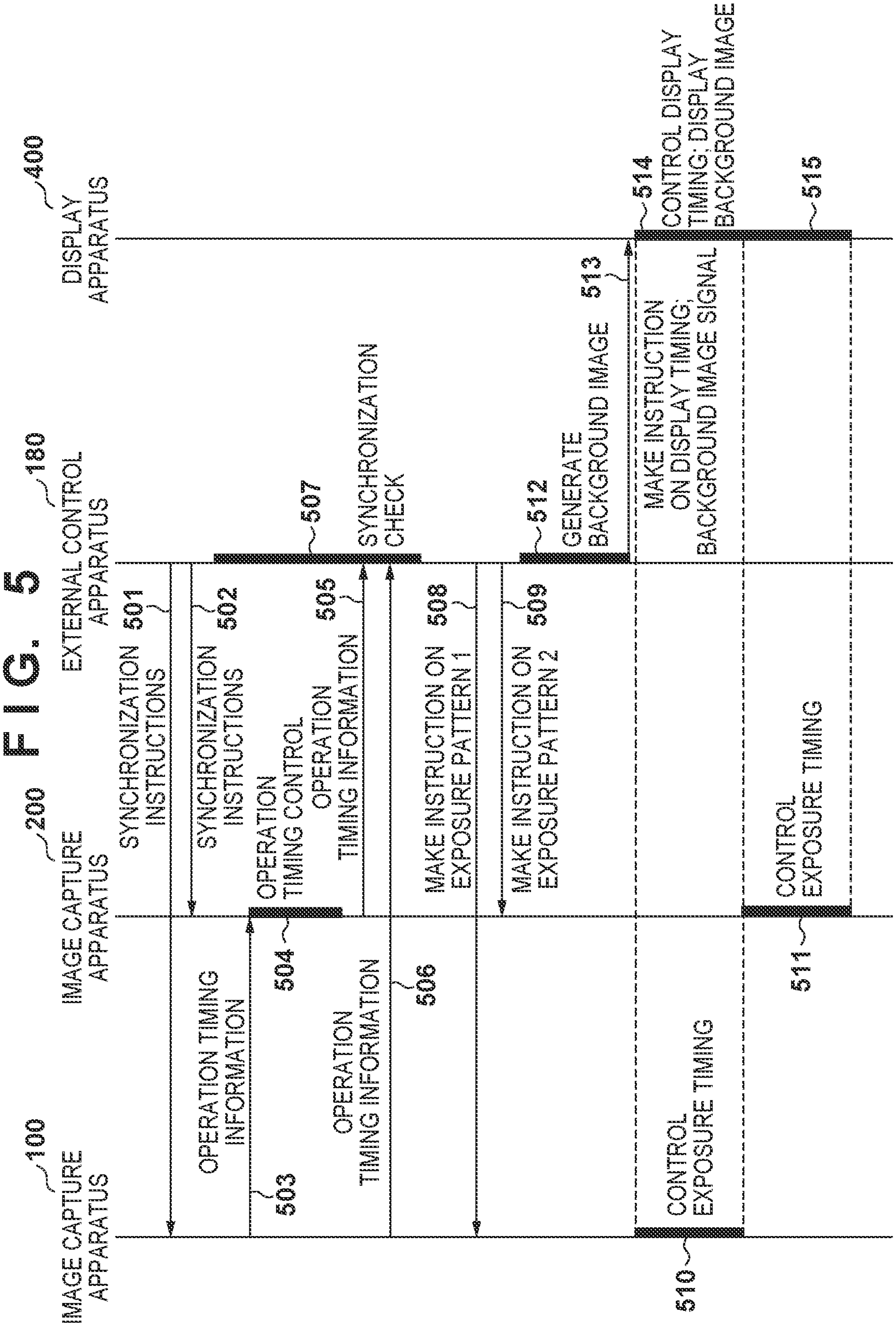
FIG. 5 is a sequence diagram related to the operations of the image capture system according to an embodiment.

FIG. 4 is a flowchart related to the operations of the control apparatus 180 according to the present embodiment. Also, FIG. 5 is a sequence diagram related to the operations of the control apparatus 180 shown in FIG. 4, and to the operations of the image capture apparatuses 100 and 200 and the display apparatus 400 based thereon.

Here, it is assumed that the operations of the image capture apparatus 100, the image capture apparatus 200, and the display apparatus 400 are controlled as a result of execution of the image capture control application by the control apparatus 180 (control unit 181). However, control that is described as being performed by the control apparatus 180 may be performed by a target apparatus itself or by another apparatus (other than the control apparatus 180).

Note, it is assumed that necessary preprocessing, such as setting of each apparatus and connection between apparatuses, has been completed before the following operations are started. Specifically, it is assumed that the image capture control application is running on the control apparatus 180, and information that is necessary for the control apparatus 180 to control the operations of the image capture apparatuses 100 and 200 and the display apparatus 400 has already been obtained from each apparatus. Furthermore, it is assumed that the image capture apparatuses 100 and 200 and the display apparatus 400 are set in an operation mode in which their operations can be controlled by the control apparatus 180.

Note that in the following description, the operations that are performed in the image capture apparatus 100 or 200 are executed by the system control unit 50 therein, whereas the operations that are performed in the control apparatus 180 are executed by the control unit 181.

In step S301, the control apparatus 180 outputs instructions related to control of operation timings to the image capture apparatus 100 and the image capture apparatus 200 (501 and 502 in FIG. 5). Here, it is assumed that the control apparatus 180 has output instructions for assigning the image capture apparatus 100 as a master apparatus among the plurality of image capture apparatuses. Image capture apparatuses other than the master apparatus execute operations that are synchronous with the master apparatus.

As the image capture apparatus 100 has been designated as the master apparatus, it supplies an external clock signal from the system timer 53 to the image capture apparatus 200. Furthermore, the image capture apparatus 100 supplies information related to the operation timings of itself to the image capture apparatus 200 (503).

Upon receiving the information related to the operation timings from the image capture apparatus 100, the image capture apparatus 200 executes an operation timing control operation so as to control its own operations in accordance with the external clock signal supplied from the image capture apparatus 100 (504). Then, the image capture apparatus 200 outputs information related to the operation timings of itself to the control apparatus 180. Furthermore, the image capture apparatus 100, too, outputs information related to the operation timings of itself to the control apparatus 180 (506).

Upon receiving the information related to the operation timings from each of the image capture apparatus 100 and the image capture apparatus 200, the control apparatus 180 checks whether the operation timings are synchronous (507). Here, it is assumed that the synchronization has been determined to be successful.

Next, in step S302, the control apparatus 180 outputs, to the image capture apparatus 100 and the image capture apparatus 200, instructions about their respective capturing periods (exposure periods) (508, 509). Here, the control apparatus 180 assigns the capturing periods so that the respective image capture apparatuses perform image capture at different timings. The control apparatus 180 can, for example, assign capturing periods that do not overlap one another to the respective image capture apparatuses as shown in FIG. 6.

The capturing periods are repeatedly assigned in a cycle corresponding to a frame rate. The control apparatus 180 notifies each individual image capture apparatus of information related to the timings of the assigned capturing period (an exposure pattern). The exposure pattern enables each individual image capture apparatus to perform image capture in a time-division style.

Figure 6:
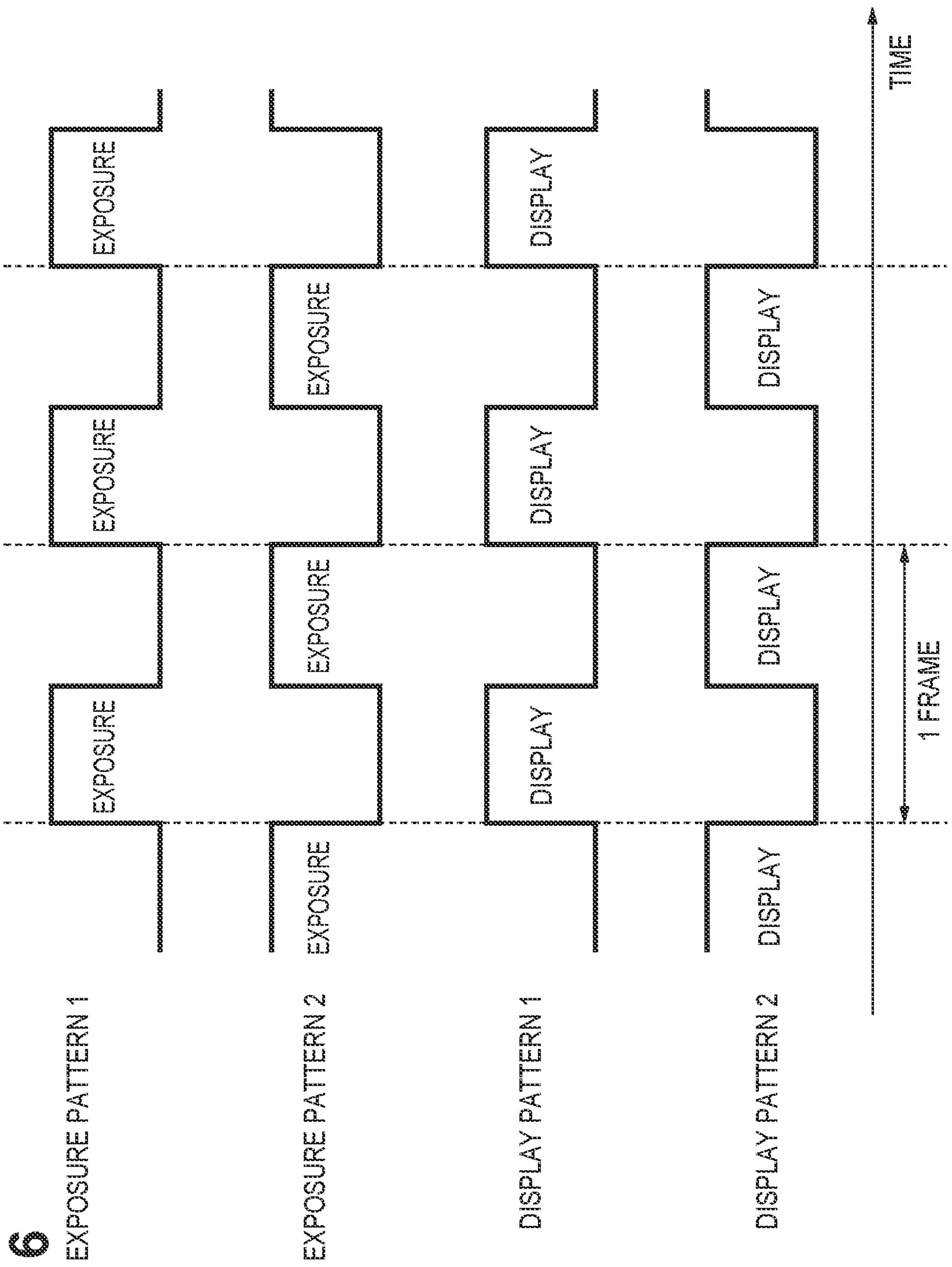
FIG. 6 is a diagram showing examples of exposure patterns and display patterns according to a first embodiment.

According to the examples shown in FIG. 6, the exposure patterns are designed so that the capturing periods of all image capture apparatuses fall within one frame period corresponding to the frame rate. Also, it is assumed that an exposure pattern 1 in which the capturing period takes place in the first half of one frame period is assigned to the image capture apparatus 100, whereas an exposure pattern 2 in which the capturing period takes place in the last half of one frame period is assigned to the image capture apparatus 200. Note that the length of the capturing period may vary with each image capture apparatus. Furthermore, one frame period may include a period in which no image capture apparatus performs image capture.

In step S303, the control apparatus 180 renders CG (background images) that are to be displayed on the display apparatus 400 during the capturing periods of the respective image capture apparatuses (512). The control apparatus 180 renders the background images using pieces of position and orientation information of the image capture apparatuses 100 and 200, which are obtained from the position and orientation detection apparatuses 201 and 202, and pieces of information related to the angles of view of the image capture apparatuses 100 and 200.

Figure 7A:
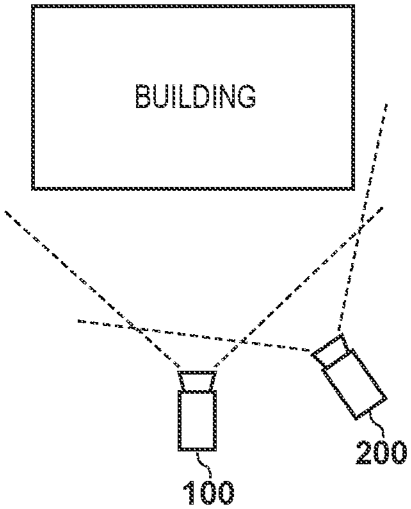
FIGS. 7A to 7C are schematic diagrams showing examples of a background image displayed in an embodiment.
Figure 7B:
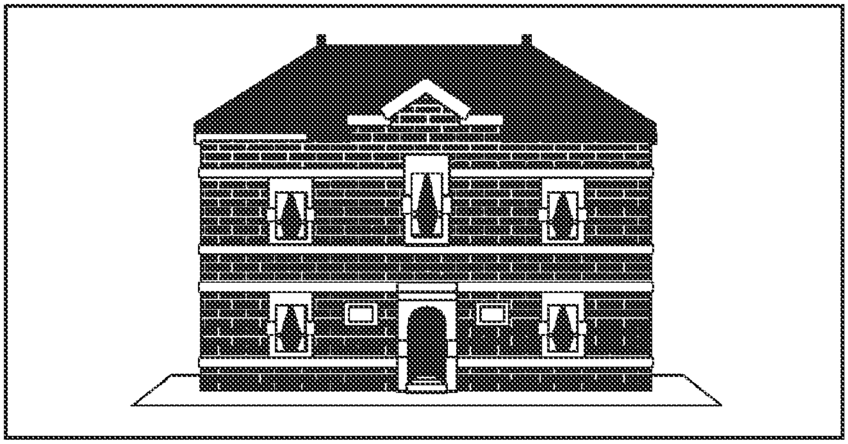
Figure 7C:
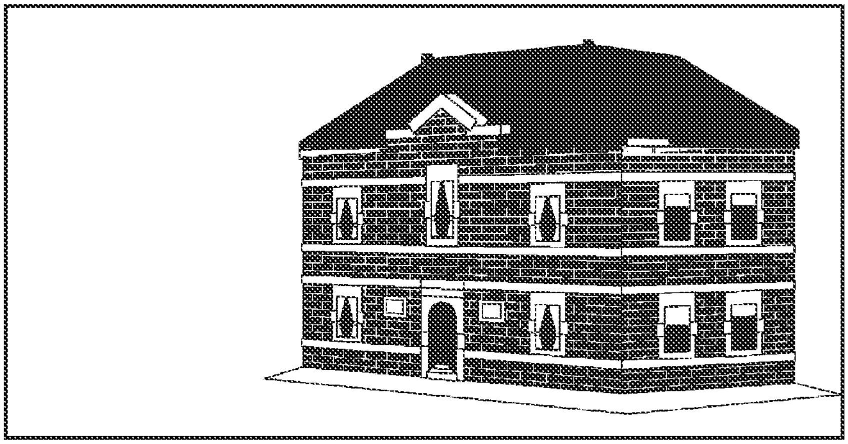

For example, assume a case where in-camera VFX videos are captured using a building as a background in accordance with the arrangement shown in a plan view of FIG. 7A. In this case, the control apparatus 180 renders a background image shown in FIG. 7B for the image capture apparatus 100, and a background image shown in FIG. 7C for the image capture apparatus 200.

The image capture apparatus 100 controls the operations of the image capture unit 22 so as to accumulate charges during the instructed exposure period of the exposure pattern 1 (510). The image capture apparatus 100 generates moving image data for recording via the image processing unit 24, and records the same into the recording medium 150. Furthermore, the image capture apparatus 100 outputs video signals for live-view display to the control apparatus 180 via the video signal I/F 18.

Similarly, the image capture apparatus 200 controls the operations of the image capture unit 22 so as to accumulate charges during the instructed exposure period of the exposure pattern 2 (511). The image capture apparatus 200 generates moving image data for recording via the image processing unit 24, and records the same into the recording medium 150. Furthermore, the image capture apparatus 200 outputs video signals for live-view display to the control apparatus 180 via the video signal I/F 18.

In step S304, the control apparatus 180 causes the display apparatus 400 to display the generated background images. The display of the background images, too, needs to be repeatedly executed in a cycle corresponding to the frame rate, similarly to the image capture. Therefore, the control apparatus 180 decides on cyclic display timings (display patterns) for the background images in correspondence with the respective image capture apparatuses. According to the examples of FIG. 6, the control apparatus 180 decides on a display pattern 1 for the image capture apparatus 100, and a display pattern 2 for the image capture apparatus 200.

Then, the control apparatus 180 instructs the display apparatus 400 to display the background image for the image capture apparatus 100 at a timing corresponding to the display pattern 1 (514), and to display the background image for the image capture apparatus 200 at a timing corresponding to the display pattern 2 (515) (513).

Note that in order to realize the timings of the exposure patterns and the display patterns shown in FIG. 6, the control apparatus 180 may change the periods in which the background images are rendered from those of FIG. 5. For example, the control apparatus 180 can render the background image for the image capture apparatus 200 during the capturing period of the image capture apparatus 100, and render the background image for the image capture apparatus 100 during the capturing period of the image capture apparatus 200.

Note that when notifying the image capture apparatuses of the exposure patterns, the control apparatus 180 can specify the start timings of the capturing periods of the respective image capture apparatuses. Furthermore, the control apparatus 180 can, for example, grasp a time difference between an instruction for display and the display based on information obtained from the display apparatus 400. Therefore, it is possible to realize a changeover between background images that is synchronous with a changeover between capturing periods, as shown in FIG. 6, by issuing a display instruction at a timing at which the background image displayed by the display apparatus 400 is changed in accordance with the start timing of the capturing period of each individual image capture apparatus.

As described above, according to the present embodiment, a capturing period is assigned to each individual image capture apparatus so that the image capture is performed at different timings, and in addition, the display apparatus is controlled so that, during each individual capturing period, a background image corresponding to the position and orientation of an image capture apparatus to which this capturing period is assigned is displayed. Therefore, in-camera VFX videos of the same scene can be captured substantially in parallel while using a plurality of image capture apparatuses.

Second Embodiment

In the first embodiment, the exposure patterns are designed so that the capturing periods of all image capture apparatuses fall within one frame period. Therefore, the length of the capturing period assigned to each individual image capture apparatus is, at the longest, the total number of image capture apparatuses/one frame period. For example, in the case of image capture at 24 frames/second and a shutter angle of 172.8 degrees, an exposure period per frame is 1/50 seconds. In this case, as (1/24)/(1/50)=2.08, the exposure periods necessary for the respective image capture apparatuses can be secured as long as there are two image capture apparatuses. However, when there are three or more image capture apparatuses, there is a shortage of exposure, or the capturing periods assigned to the image capture apparatuses overlap one another.

The present embodiment enables each individual image capture apparatus to perform image capture using an appropriate background image even in a case where the capturing periods overlap one another. The present embodiment is basically similar to the first embodiment, except for the exposure patterns and the display patterns that are decided on by the control apparatus 180. Therefore, the following only describes the operations of the control apparatus 180 according to the present embodiment, using the flowchart of FIG. 4.

Note that the following describes a case where three image capture apparatuses (an image capture apparatus A, an image capture apparatus B, and an image capture apparatus C) are connected to the control apparatus 180. In this case, the control apparatus 180 includes a larger number of communication interfaces than in the example shown in FIG. 3. Furthermore, the same idea is applicable also to a case where four or more image capture apparatuses are connected.

In the present embodiment, with respect to the three image capture apparatuses A, B, and C, the control apparatus 180 assigns capturing periods which have the lengths obtained from a frame rate and a shutter angle (1/50 seconds in the aforementioned example), and which have different start timings. Specifically, provided that the number of image capture apparatuses is n, the control apparatus 180 assigns capturing periods to the respective image capture apparatuses so that the start timings are staggered by 1/n of one frame period F (=F/n). Note that the length of the capturing period may vary with each image capture apparatus.

Therefore, in step S301 of FIG. 4, the control apparatus 180 provides the respective image capture apparatuses A, B, and C with instructions indicating the operation timings that are staggered by F/3. Then, the control apparatus 180 obtains information of the operation timings of the respective image capture apparatuses, and confirms whether the image capture apparatuses are operating at the instructed timings. Here, it is assumed that it has been able to confirm that the image capture apparatuses are operating at the instructed timings.

Figure 8:
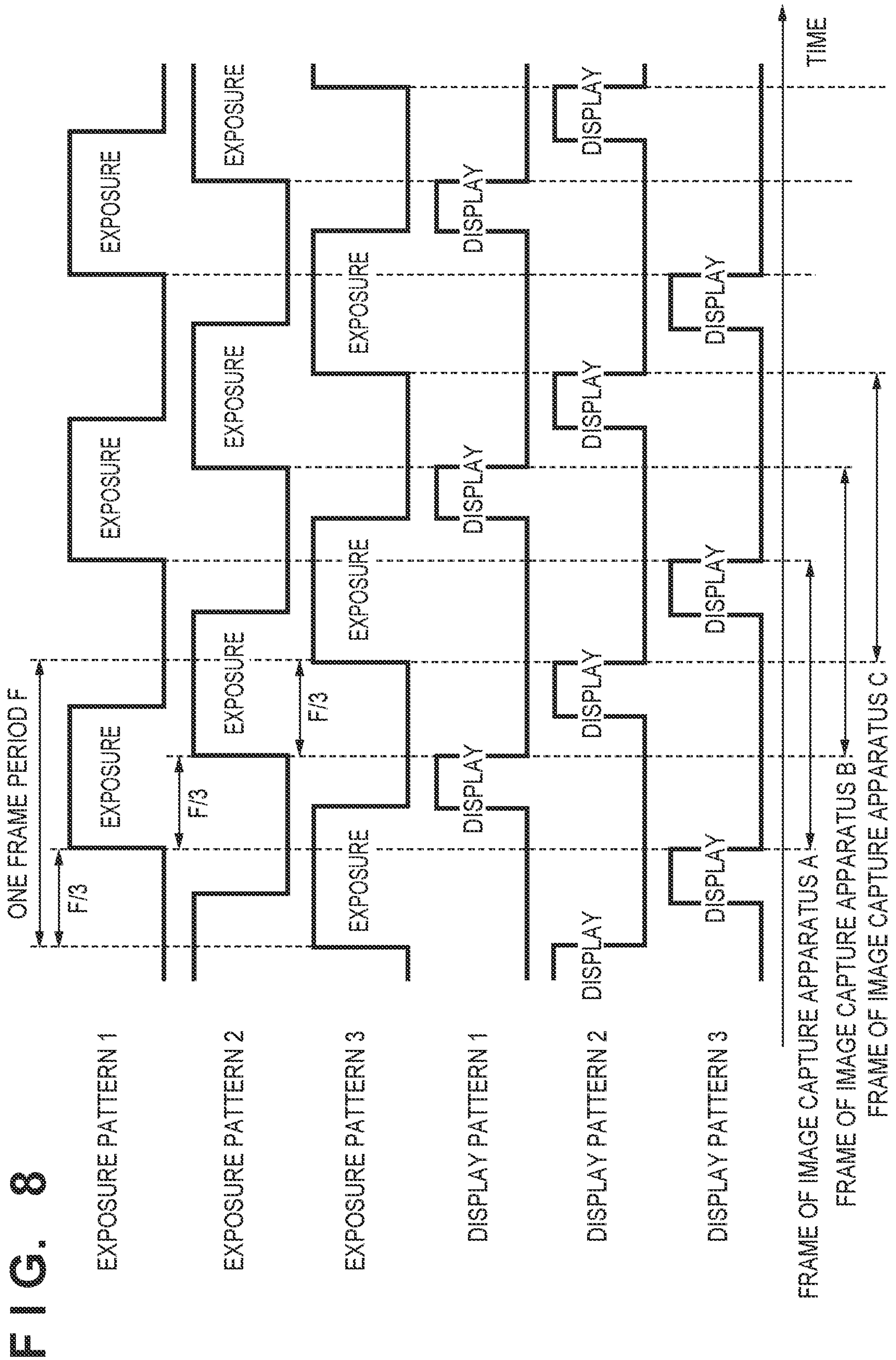
FIG. 8 is a diagram showing examples of exposure patterns and display patterns according to a second embodiment.

Next, in step S302, the control apparatus 180 decides on, for example, exposure patterns shown in FIG. 8 and notifies the respective image capture apparatuses A, B, and C of the same. Here, it is assumed that an exposure pattern 1, an exposure pattern 2, and an exposure pattern 3 have been decided on for the image capture apparatus A, the image capture apparatus B, and the image capture apparatus C, respectively.

In step S303, the control apparatus 180 generates background images that are appropriate for the respective image capture apparatuses, similarly to the first embodiment.

In step S304, the control apparatus 180 causes the display apparatus 400 to display the generated background images. At this time, the control apparatus 180 controls display on the display apparatus 400 so that the background image for the target image capture apparatus is displayed during a period which is included in the capturing period of the target image capture apparatus and which is not included in the capturing periods of other image capture apparatuses.

According to the examples shown in FIG. 8, with regard to the image capture apparatus A to which the exposure pattern 1 is assigned, the control apparatus 180 controls display timings so that the background image for the image capture apparatus A is displayed on the display apparatus 400 in accordance with a display pattern 1. With regard to the image capture apparatuses B and C as well, the control apparatus 180 similarly controls display timings of the background images in accordance with display patterns 2 and 3.

Displaying a background image during a period with no overlap of image capture apparatuses enables each individual image capture apparatus to perform image capture using an appropriate background image that suits the position and orientation thereof, while preventing the plurality of image capture apparatuses from capturing the same background image. Furthermore, as the periods in which the respective image capture apparatuses capture background images fall within one frame period, the respective image capture apparatuses can capture in-camera VFX videos of the same scene substantially in parallel in the present embodiment as well.

Note that the lengths of the capturing periods are set based on the frame rate and the shutter angle herein; accordingly, for example, image capture can be performed at a shutter speed that can suppress flickering. However, as a background image is displayed only in a part of a capturing period, the exposure amount of the background image decreases relative to the exposure amount of a subject in the foreground. For example, in a case where the length of the capturing period is F/2, the display period of the background image is F/6, and the exposure amount of the background image is 1/3 of the exposure amount of the subject in the foreground.

In view of this, the brightness of the background image can be corrected so as to make the exposure amount of the background image similar to that of the subject in the foreground. For example, in a case where the exposure amount of the background image is 1/3 of the exposure amount of the subject in the foreground, the difference between the exposure amounts of the foreground and the background image can be eliminated by making a correction so that the brightness of the background images generated in step S303, or the reference display luminance of the display apparatus 400, is tripled.

Furthermore, when the background image is moving images, there is a case where the difference between the exposure periods of the subject in the foreground and the background image causes different image blurs, which is unpleasant to observe. In this case, the unpleasantness can be alleviated by rendering the background images in step S303 so as to alleviate the difference between image blurs caused by the difference between the exposure periods.

Note that in a case where the shutter speed (the lengths of the capturing periods) can be changed, capturing periods that do not overlap one another may be assigned to the respective image capture apparatuses, similarly to the first embodiment. In this case, it is sufficient to increase the sensitivity of image capture so as to supplement the shortage of exposure. Alternatively, the shortage of exposure may be corrected with respect to underexposed images at the time of post-production. In these cases, the exposure patterns and the display patterns can be decided on in a manner similar to the first embodiment, even in a case where three or more image capture apparatuses are used.

Other Embodiments

In the above-described embodiments, the respective image capture apparatuses are notified of the exposure patterns that have been decided on by the control apparatus 180, and the system control units of the respective image capture apparatuses control the operations of the image capture apparatuses so as to perform image capture at timings that conform with the notified exposure patterns.

However, one specific image capture apparatus (master apparatus) may be notified of all of the exposure patterns that have been decided on by the control apparatus 180, and the system control unit of the master apparatus may control the operation timings of other image capture apparatuses in accordance with the corresponding exposure patterns. For example, the system control unit of the master apparatus may perform control to execute the image capture operations at the operation timings corresponding to the exposure patterns by issuing instructions from the control signal I/F 19 to other image capture apparatuses at the timings corresponding to the exposure patterns of other image capture apparatuses. In this case, the master apparatus places the operation timings of other image capture apparatuses in synchronization with clock signals shared with itself by supplying external clock signals from the system timer to other image capture apparatuses.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to example embodiments, it is to be understood that the invention is not limited to the disclosed example embodiments. The present invention is defined by the following claims. The scope of the following claims is to be accorded the broadest interpretation so as to encompass all such modifications and equivalent structures and functions.

This application claims the benefit of Japanese Patent Application No. 2022-069593, filed on Apr. 20, 2022, which is hereby incorporated by reference herein in its entirety.

What is claimed is:

1. A control apparatus of an image capture system that performs image capture using an image displayed by a display apparatus as a background, the control apparatus comprising:

one or more processors that execute a program stored in a memory and thereby function to:

assign capturing periods of different timings to respective image capture apparatuses of the image capture system;

control the image capture apparatuses so that each of the image capture apparatuses performs image capture during the capturing period assigned thereto; and cause the display apparatus to display an image based on the image capture apparatus to which the capturing period has been assigned, wherein each of the image capture apparatuses is assigned a capturing period that partially overlaps a capturing period assigned to another image capture apparatus, wherein the image based on the image capture apparatus to which the capturing period has been assigned is an image corresponding to a position and an orientation of the image capture apparatus to which the capturing period has been assigned, and wherein the display apparatus is caused to display the image, for each of the image capture apparatuses, in a non-overlapped part of the captured period assigned to the image capture apparatus.

2. The control apparatus according to claim 1, wherein the capturing periods are assigned so that the capturing periods are assigned to the respective image capture apparatuses within one frame period.

3. The control apparatus according to claim 2, wherein the respective image capture apparatuses are assigned capturing periods that do not overlap one another.

4. The control apparatus according to claim 1, wherein the display apparatus is caused to display the image during a period which is included in the capturing period and which does not overlap other capturing periods.

5. The control apparatus according to claim 4, wherein the one or more processors further function to:

correct, in an image captured by the image capture apparatus, a difference in brightness between an area corresponding to the background and an area corresponding to a subject in a foreground.

6. The control apparatus according to claim 5, wherein the difference in brightness is corrected by correcting brightness of the image.

7. The control apparatus according to claim 5, wherein the difference in brightness is corrected by correcting display luminance of the display apparatus.

8. A control method executed by an image capture system that performs image capture using an image displayed by a display apparatus as a background, the control method comprising:

assigning capturing periods of different timings to respective image capture apparatuses of the image capture system;

controlling the image capture apparatuses so that each of the image capture apparatuses performs image capture during the capturing period assigned thereto; and causing the display apparatus to display an image based on the image capture apparatus to which the capturing period has been assigned, wherein the assigning assigns, to each of the image capture apparatuses, a capturing period that partially overlaps a capturing period assigned to another image capture apparatus, wherein the image based on the image capture apparatus to which the capturing period has been assigned is an image corresponding to a position and an orientation of the image capture apparatus to which the capturing period has been assigned, and wherein in the causing, the display apparatus is caused to display the image, for each of the image capture apparatuses, in a non-overlapped part of the captured period assigned to the image capture apparatus.

9. The control method according to claim 8, wherein the assigning assigns the capturing periods so that the capturing periods are assigned to the respective image capture apparatuses within one frame period.

10. The control method according to claim 9, wherein the assigning assigns, to the respective image capture apparatuses, capturing periods that do not overlap one another.

11. The control method according to claim 8, wherein the causing causes the display apparatus to display the image during a period which is included in the capturing period and which does not overlap other capturing periods.

12. The control method according to claim 11, further comprising

Correcting, in an image captured by the image capture apparatus, a difference in brightness between an area corresponding to the background and an area corresponding to a subject in a foreground.

13. The control method according to claim 12, wherein the correcting corrects the difference in brightness by correcting brightness of the image.

14. The control method according to claim 12, wherein the correcting corrects the difference in brightness by correcting display luminance of the display apparatus.

15. A non-transitory computer-readable medium storing a program causing, when the program is executed by a computer, the computer to perform a control method of an image capture system that performs image capture using an image displayed by a display apparatus as a background, the control method comprising:

assigning capturing periods of different timings to respective image capture apparatuses of the image capture system;

controlling the image capture apparatuses so that each of the image capture apparatuses performs image capture during the capturing period assigned thereto; and causing the display apparatus to display an image based on the image capture apparatus to which the capturing period has been assigned, wherein the assigning assigns, to each of the image capture apparatuses, a capturing period that partially overlaps a capturing period assigned to another image capture apparatus, wherein the image based on the image capture apparatus to which the capturing period has been assigned is an image corresponding to a position and an orientation of the image capture apparatus to which the capturing period has been assigned, and wherein in the causing, the display apparatus is caused to display the image, for each of the image capture apparatuses, in a non-overlapped part of the captured period assigned to the image capture apparatus.

* * * * *